(12) United States Patent
Siliqi

(10) Patent No.: US 8,985,046 B2
(45) Date of Patent: Mar. 24, 2015

(54) FOLDABLE WING FOR STREAMER STEERING DEVICE AND METHOD

(71) Applicant: CGGVeritas Services SA, Massy Cedex (FR)

(72) Inventor: Risto Siliqi, Paris (FR)

(73) Assignee: CGGVeritas Services SA, Massy Cedex (FR)

( * ) Notice: Subject to any disclaimer, the term of this patent is extended or adjusted under 35 U.S.C. 154(b) by 88 days.

(21) Appl. No.: 13/845,552

(22) Filed: Mar. 18, 2013

(65) Prior Publication Data

US 2014/0251198 A1 Sep. 11, 2014

(30) Foreign Application Priority Data

Mar. 5, 2013 (FR) ...................................... 13 51954

(51) Int. Cl.
*B63G 8/14* (2006.01)
*B63B 21/66* (2006.01)
*G01V 1/38* (2006.01)

(52) U.S. Cl.
CPC .............. *B63B 21/66* (2013.01); *G01V 1/3826* (2013.01)
USPC ............................................ 114/245; 367/17

(58) Field of Classification Search
USPC ............................................. 367/17; 114/245
See application file for complete search history.

(56) References Cited

U.S. PATENT DOCUMENTS

| | | | | |
|---|---|---|---|---|
| 3,605,674 A * | 9/1971 | Weese | | 114/245 |
| 3,774,570 A * | 11/1973 | Pearson | | 114/245 |
| 3,931,608 A * | 1/1976 | Cole | | 367/17 |
| 3,943,483 A * | 3/1976 | Strange | | 367/17 |
| 3,953,905 A * | 5/1976 | Paitson | | 441/17 |
| 3,961,303 A * | 6/1976 | Paitson | | 367/17 |
| 4,463,701 A * | 8/1984 | Pickett et al. | | 114/245 |
| 4,711,194 A * | 12/1987 | Fowler | | 114/245 |
| 4,992,992 A * | 2/1991 | Dragoset, Jr. | | 367/21 |
| 6,011,752 A * | 1/2000 | Ambs et al. | | 367/17 |
| 6,016,286 A * | 1/2000 | Olivier et al. | | 367/17 |
| 6,031,789 A * | 2/2000 | Broussard et al. | | 367/16 |
| 6,144,342 A * | 11/2000 | Bertheas et al. | | 343/709 |
| 6,459,653 B1 * | 10/2002 | Kuche | | 367/17 |

(Continued)

FOREIGN PATENT DOCUMENTS

| WO | 99/04293 A1 | 1/1999 | |
|---|---|---|---|
| WO | WO 9904293 A1 * | 1/1999 | ............... G01V 1/38 |
| WO | 2008/115630 A2 | 9/2008 | |

OTHER PUBLICATIONS

European Search Report completed Jun. 30, 2014, in related European Application No. 14157604.

(Continued)

*Primary Examiner* — Lars A Olson
*Assistant Examiner* — Jovon Hayes
(74) *Attorney, Agent, or Firm* — Patent Portfolio Builders PLLC

(57) ABSTRACT

A streamer steering device to be attached to a streamer or a source of a marine seismic survey system. The streamer steering device includes a casing configured to be attached to the streamer or to the source; a wing assembly connected to the casing and having an active surface used to control depth and/or lateral position of the streamer; and an actuating mechanism located inside the casing and connected to the wing assembly, the actuating mechanism being configured to change a state of the wing assembly from an operational state to a folded state. The active surface has substantially the same area during the operational state and the folded state.

17 Claims, 12 Drawing Sheets

(56) References Cited

U.S. PATENT DOCUMENTS

| | | | |
|---|---|---|---|
| 6,525,992 B1* | 2/2003 | Olivier et al. | 367/17 |
| 6,671,223 B2* | 12/2003 | Bittleston | 367/19 |
| 6,879,542 B2* | 4/2005 | Soreau et al. | 367/17 |
| 6,932,017 B1* | 8/2005 | Hillesund et al. | 114/244 |
| 6,985,403 B2* | 1/2006 | Nicholson | 367/16 |
| 7,092,315 B2* | 8/2006 | Olivier | 367/17 |
| 7,610,871 B2 | 11/2009 | Leclercq et al. | |
| 7,793,606 B2* | 9/2010 | Olivier et al. | 114/245 |
| 7,800,976 B2 | 9/2010 | Stokkeland et al. | |
| 2006/0176775 A1* | 8/2006 | Toennessen | 367/16 |
| 2006/0285434 A1* | 12/2006 | Welker et al. | 367/19 |
| 2008/0304357 A1 | 12/2008 | Toennessen | |
| 2014/0036624 A1* | 2/2014 | Tonchia | 367/16 |
| 2014/0185409 A1* | 7/2014 | Voldsbekk | 367/17 |

OTHER PUBLICATIONS

Extended European Search Report dated Jul. 7, 2014, in related European Application No. 14157604.

* cited by examiner

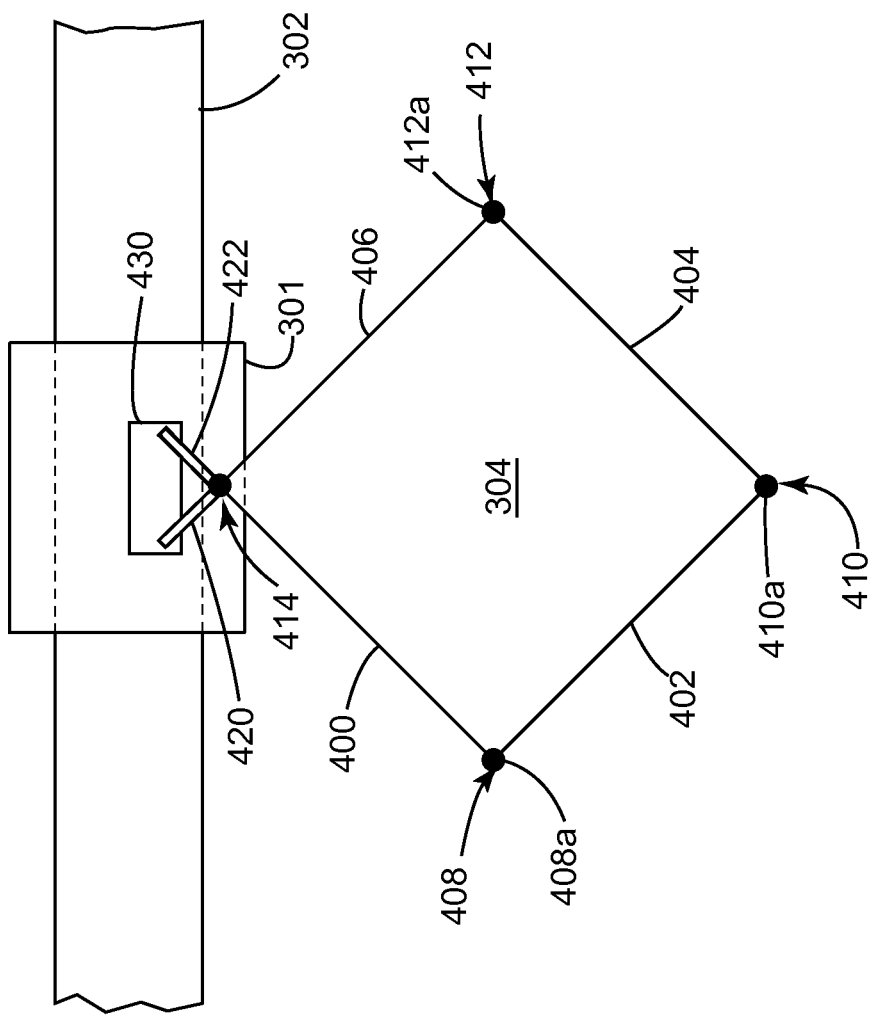

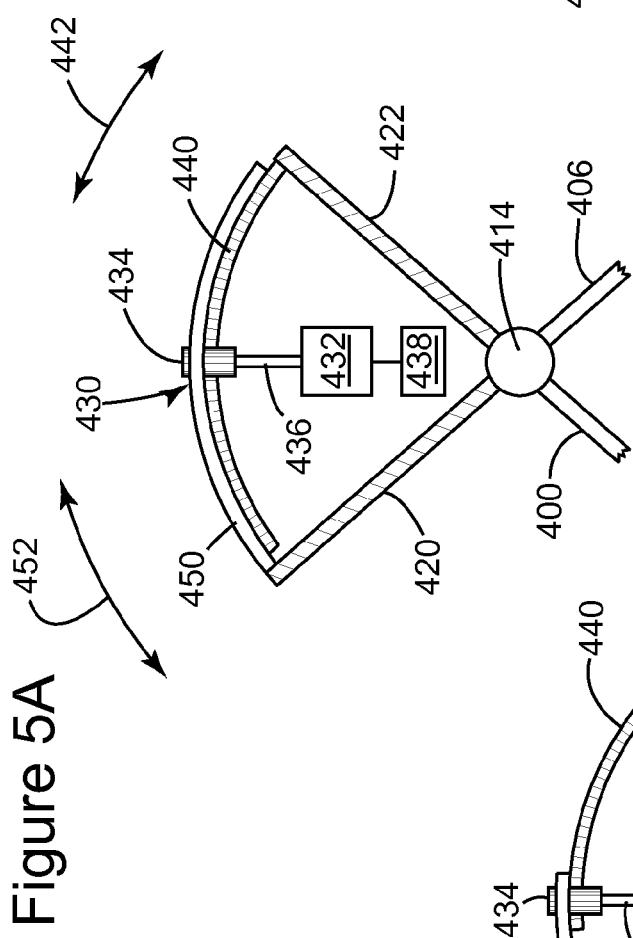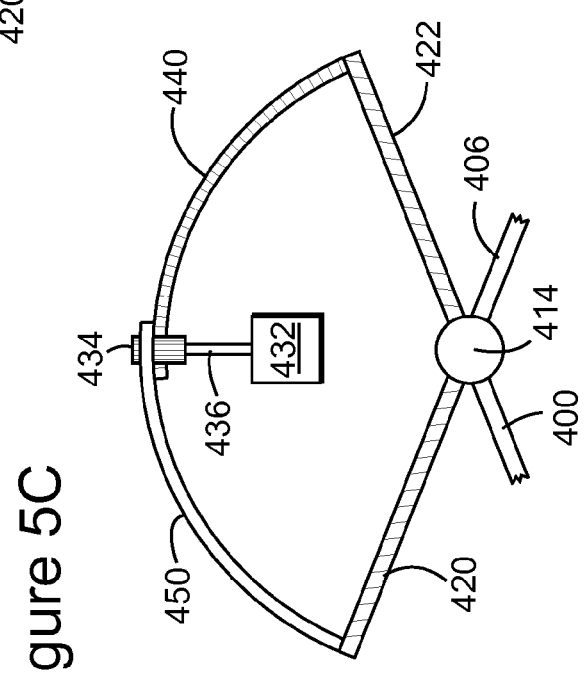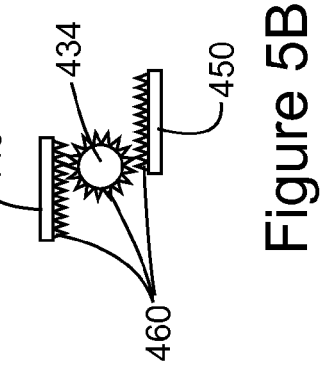

FOLDABLE WING FOR STREAMER STEERING DEVICE AND METHOD

BACKGROUND

1. Technical Field

Embodiments of the subject matter disclosed herein generally relate to streamer steering devices that are attached to streamers or sources of marine seismic survey systems and are being used to control depth and/or lateral position of the streamer or source, and, in particular, to streamer steering devices having foldable wings.

2. Discussion of the Background

Marine seismic surveys are used to generate an image of the geophysical structure under the seafloor in order to reduce the likelihood of drilling a dry well. During a seismic survey, as shown in FIG. 1, a vessel 110 tows one or more seismic sources 120 configured to generate acoustic waves 122a that propagate downward and penetrate the seafloor 124 until eventually being reflected by a reflecting structure 126.

Vessel 110 also tows acoustic detectors 112 arranged along a cable 114. Cable 114 and detectors 112 form what is known as a streamer 116. Detectors 112 acquire information (seismic data) about reflected waves 122b, 122c and 122d.

Streamer 116 may be towed horizontally, i.e., lying at a constant depth relative to the water's surface 118 (as illustrated in FIG. 1) or slanted relative to surface 118 (as disclosed, for example, in U.S. Pat. No. 4,992,992).

Vessel 110 may tow plural streamers at the same time. During seismic data acquisition, the streamers' depth and lateral positions may be controlled using steering devices 130 known as "streamer steering devices." The streamer steering devices are attached to the streamers.

A streamer steering device typically has solid control surfaces (referred to as wings or fins) attached to a body and allowed to rotate around an axis while an active area of the control surfaces is constant. When a streamer steering device's control surface moves through water, pressure on one side of such a surface may become greater than pressure on the other side thereof. The pressure difference yields a force perpendicular to the control surface and proportional to the area of its projection. This force is used to adjust a streamer steering device's location.

When the streamers are no longer used (i.e., the seismic survey has ended), they are retrieved on vessel 110. Conventional streamer steering devices, and, in particular, their control surfaces extending away from cable 114, may be damaged during recovery. In view of their length and flexibility, the streamers are usually retrieved and stored on spools located on the deck of the vessel. When the streamers are retrieved, the solid control surfaces of conventional streamer steering devices may be damaged or may get entangled, making it difficult to later roll out the streamers. Therefore, the wings of the streamer steering devices or the streamer steering devices themselves have to be removed from the streamers when the streamers are retrieved, which is a time-consuming procedure.

In instances when an accidental loss of towing speed occurs, the control surfaces may not accomplish the intended steering, but instead cause undesirable drag forces that amplify the slow-down. In other instances, if the streamers get too close to one another, the streamer steering device's control surfaces may become entangled with neighboring streamers. In still another instance, a wing of the streamer steering device may be damaged (e.g., broken) and thus, the streamer steering device may start to spin. In this situation, although the operator may be aware of the damaged streamer steering device, he or she can do nothing to minimize the disturbance created by its malfunction.

Furthermore, there are instances in which streamers need to be cleaned while deployed underwater to remove biofouling settlement that accumulates on their exterior surface. Cleaning devices used on the streamers are negatively impacted by the streamer steering device's control surfaces extending away from the streamer, because they prevent the cleaning devices from passing over the streamer steering device's location. Therefore, cleaning devices must be manually repositioned or they are limited to cleaning the streamer only between two adjacent streamer steering devices.

Accordingly, it would be desirable to provide streamer steering devices and methods that avoid the afore-described problems related to the control surfaces.

SUMMARY

According to an exemplary embodiment there is a streamer steering device for a streamer or a source of a marine seismic survey system. The streamer steering device includes a casing configured to be attached to the streamer or to the source; a wing assembly connected to the casing and having an active surface used to control depth and/or lateral position of the streamer; and an actuating mechanism located inside the casing and connected to the wing assembly, the actuating mechanism being configured to change a state of the wing assembly from an operational state to a folded state. The active surface has substantially the same area during the operational state and the folded state.

According to another embodiment, there is a marine seismic survey system for collecting seismic data. The marine seismic survey system includes a streamer and a streamer steering device connected to the streamer. The streamer steering device includes a casing configured to be attached to the streamer, a wing assembly connected to the casing and having an active surface used to control depth and/or lateral position of the streamer, and an actuating mechanism located inside the casing and connected to the wing assembly, the actuating mechanism being configured to change a state of the wing assembly from an operational state to a folded state. The active surface has substantially the same area during the operational state and the folded state.

According to yet another embodiment, there is a method for folding a streamer steering device. The method includes a step of attaching the streamer steering device to a streamer; a step of releasing, from a vessel, the streamer into water; a step of controlling orientations of wings of the streamer steering device for actively controlling a position of the streamer; and a step of adjusting the wings to change their state from an operational state to a folded state. The active surface of the wings has substantially the same area during the operational state and the folded state.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 4 is a schematic diagram of a streamer steering device having half deployed wings according to an embodiment;

FIGS. 5A-C illustrate how foldable wings of a streamer steering device are deployed according to an embodiment;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a streamer steering device for a streamer of a marine seismic survey system. However, such a streamer steering device may be used with other parts of a seismic survey system, e.g., a source.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
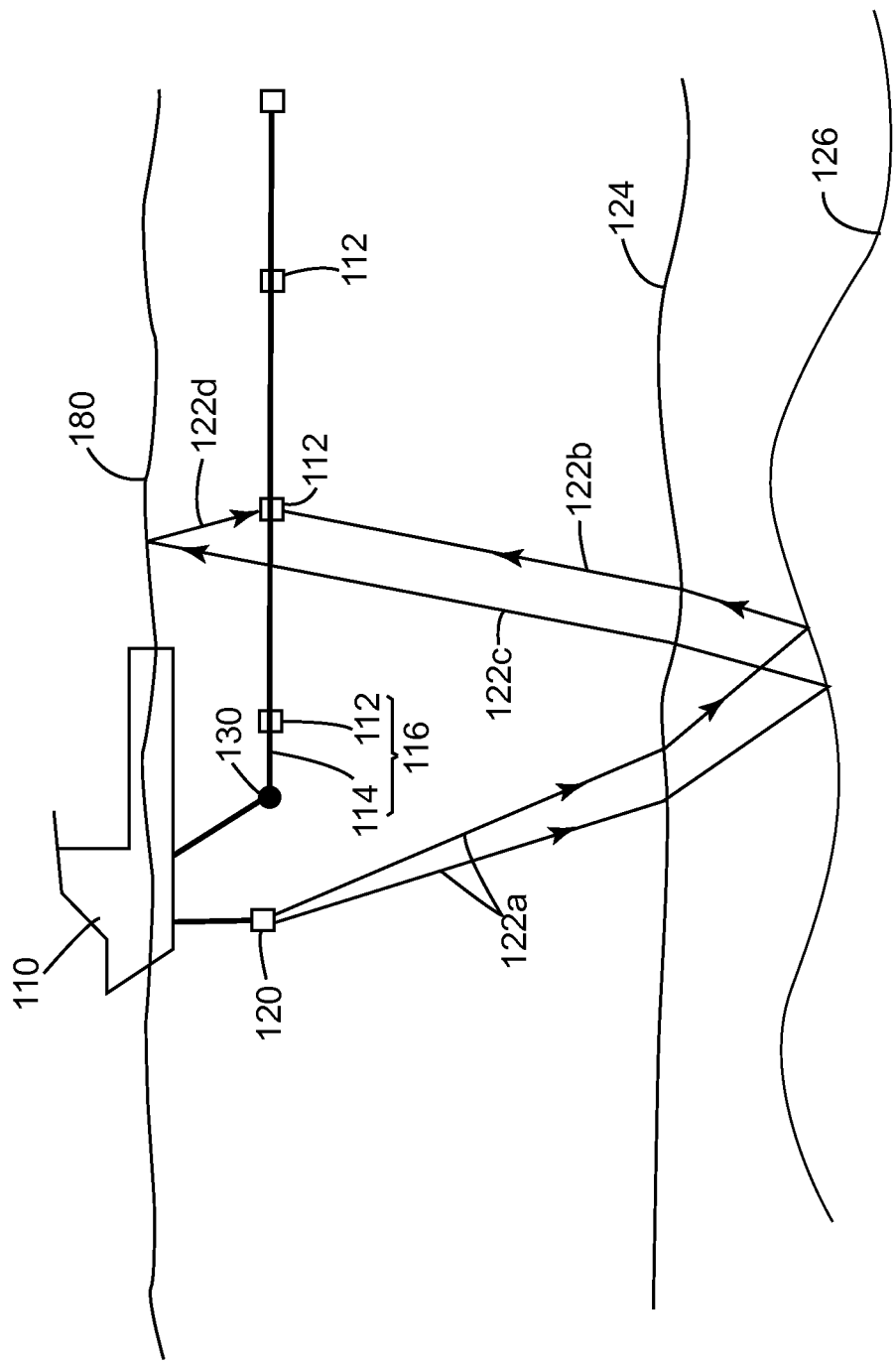
FIG. 1 is a schematic diagram of a marine seismic survey system.
Figure 2:
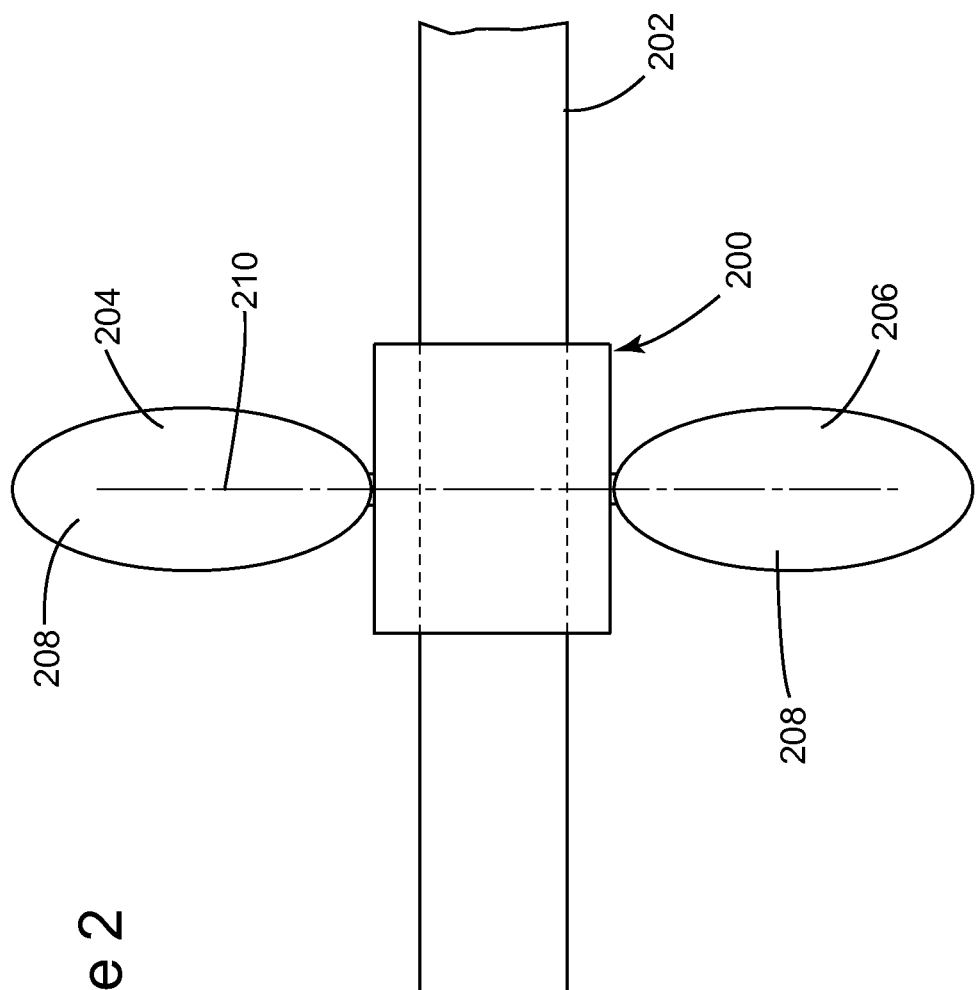
FIG. 2 is a schematic diagram of a streamer steering device.

Prior to discussing the novel foldable streamer steering device, a traditional bird is illustrated in FIG. 2. Bird 200 is attached to streamer 202 and has two wings 204 and 206. Both wings 204 and 206 include corresponding solid surfaces 208, i.e., each wing is made as a single solid surface. The wings may be rotatable around an axis 210 for controlling the streamer's depth or lateral position. However, as discussed previously, these wings are not foldable or retrievable and, thus, they cannot be passed by a cleaning device designed to move up and down the streamer.

Figure 3:
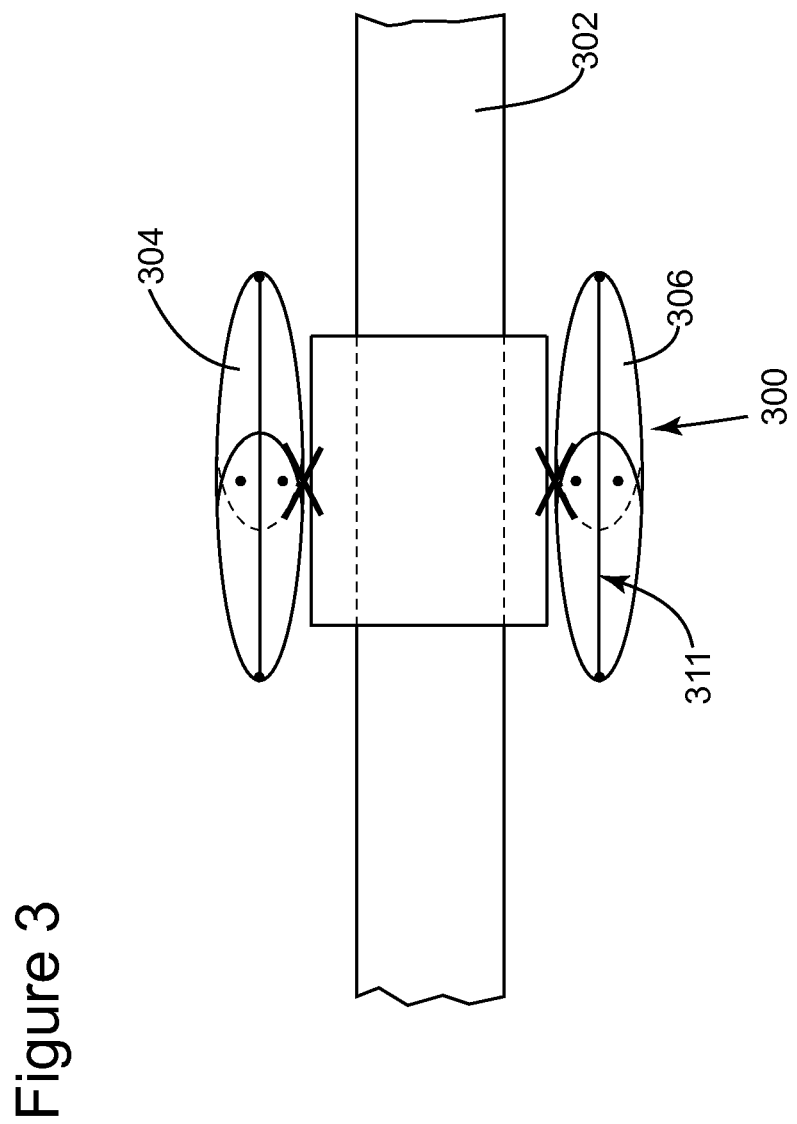
FIG. 3 is a schematic diagram of a streamer steering device having foldable wings according to an embodiment.

FIG. 3 illustrates an embodiment in which a streamer steering device 300 has foldable wings. Streamer steering device 300 is attached to streamer 302 in such a way that it may rotate relative to the streamer. In another embodiment, the streamer steering device may be fixedly attached to the streamer so that its rotation twists the streamer. A base of the streamer steering device may be in line with the streamer, i.e., connected between two consecutive portions of the streamer, or it may be clamped (attached) to the streamer.

Streamer steering device 300 may have a wing assembly for steering, which may include two or more wings. FIG. 3 shows the streamer steering device 300 having two wings 304 and 306 for simplicity. However, wings 304 and 306 are foldable as discussed next for permitting a cleaning device to easily pass over the streamer steering device. FIG. 3 illustrates streamer steering device 300 having wings 304 and 306 folded, i.e., not in an operational state. This state may be called inactive state or folded state. To be able to unfold the wings, to make them operational, i.e., to be able to control the position of the streamer, wings 304 and 306 may have the configuration illustrated in FIG. 4 (again for simplicity, only the details of one wing 304 are shown in this figure).

Wing 304 has, for example, four sides 400, 402, 404 and 406 that are connected to each other at joints 408, 410, and 412. These joints allow the four sides to rotate, one relative to another. Each joint may include a pin (e.g., 408a, 410a and 412a) that connects two adjacent sides. A base joint 414 may connect sides 400 to 406, which are proximal to the casing 301 of streamer steering device 300. In one application, the two sides 400 and 406 are not connected to each other, but rather each is connected via a corresponding joint to the casing 301 of streamer steering device 300.

In one application, sides 400, 402, 404 and 406 may have a substantially similar length, thus forming a square or diamond in an intermediate position between the folded state and the operational state. Sides 400 and 406, which are proximal to casing 301 of the streamer steering device, may have or be connected to corresponding actuating arms 422 and 420, respectively. Actuating arms 420 and 422 are connected to an actuating mechanism 430 configured to actuate them, i.e., to change the wing from the operational state to its folded state and vice versa.

Figure 6:
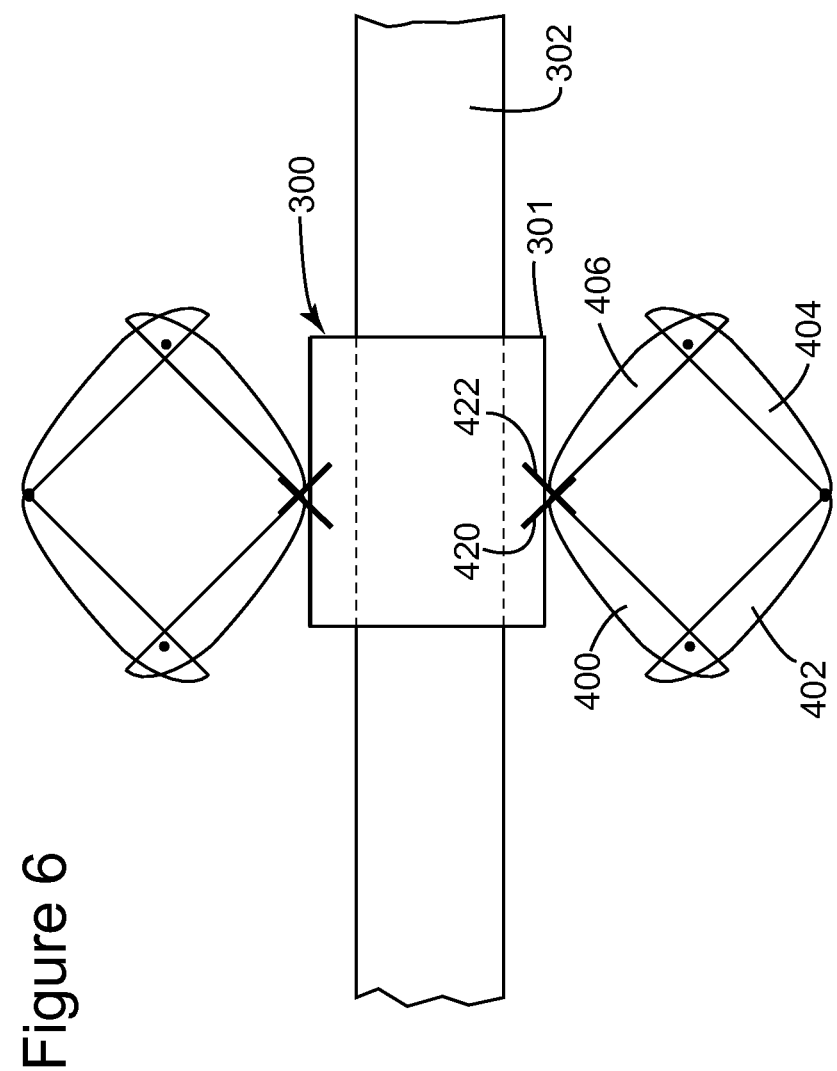
FIG. 6 is a schematic diagram of a streamer steering device having foldable wings according to an embodiment.
Figure 7:
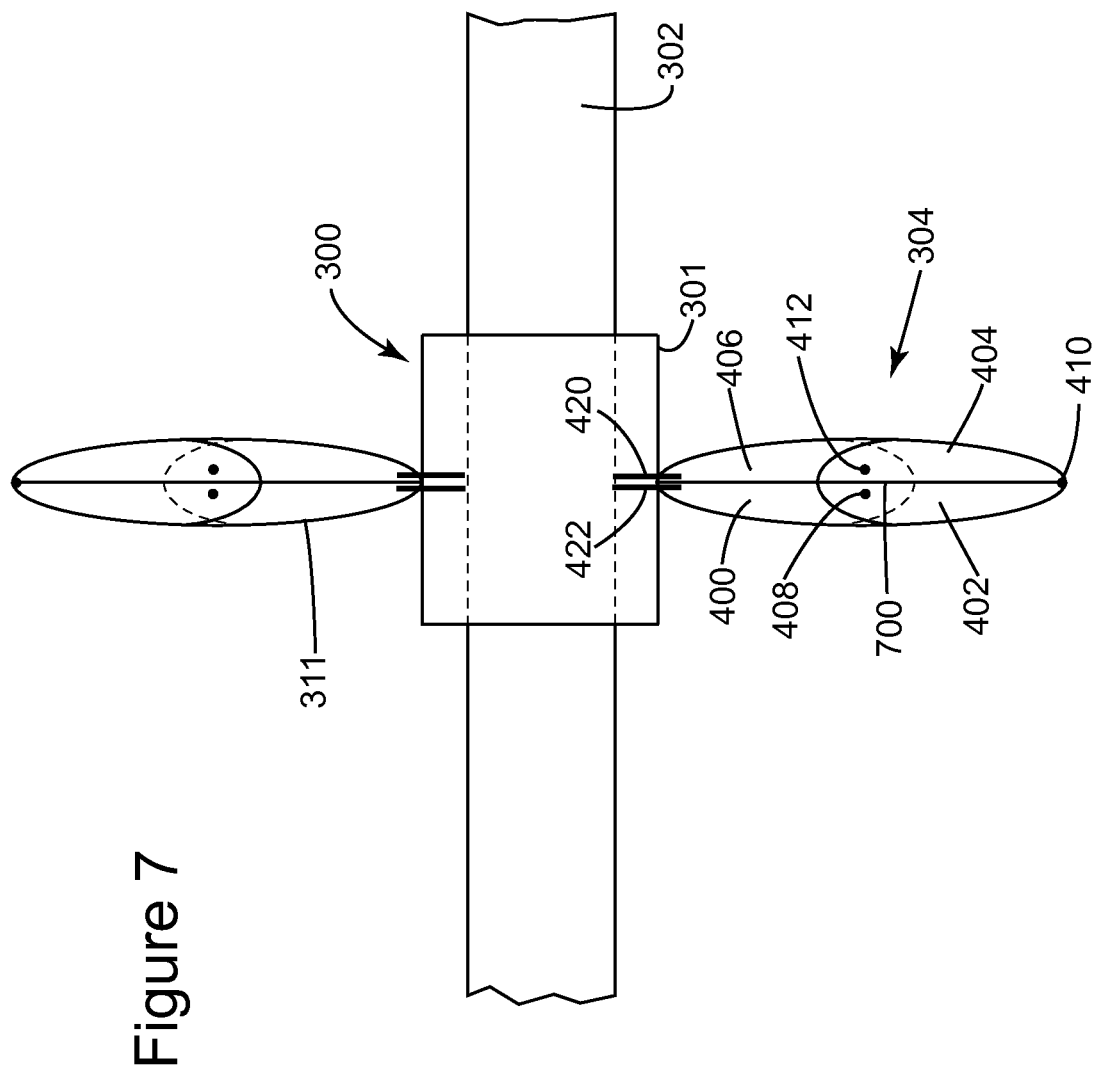
FIG. 7 is a schematic diagram of a streamer steering device having the wings fully deployed according to an embodiment.

Thus, wing 304 has a reconfigurable geometry in the sense that various components of the wings (e.g., sides 400, 402, 404 and 406) may be rearranged to form an active surface 311 that either extends away from casing 301, as illustrated in FIG. 7, or extends along casing 301 as illustrated in FIG. 3. In one embodiment, active surface 311 has substantially the same surface area A in both the operational state (FIG. 7) and the folded state (FIG. 3). The term "substantially" is used in this context to account for the fact that, as illustrated in FIG. 6, the various parts forming the active surface may overlap with different degrees during the various states, and thus area A may vary from state to state, but insubstantially (e.g., less than 20 percent). In other words, in one embodiment, area A of active surface 311 in contact with the water is the same in both the operational and folded states. An active surface 311 may be defined as that surface of the streamer steering device's wing outside casing 301 and in direct contact with the water which contributes to steering the streamer steering device. This is different from a configuration in which the active surface of the wing is reduced in the folded state relative to the operational state.

An example of an actuating mechanism 430 is illustrated in FIG. 5A and it includes one motor 432 connected to a mesh gear 434 through a shaft 436. Mesh gear 434 is configured to engage (simultaneously in one application) curved tracks 440 and 450, which are connected to actuating arms 422 and 420, respectively. Thus, when motor 432 is instructed by control unit 438 to actuate the wings, mesh gear 434 starts to rotate clockwise or counterclockwise, depending on whether the wings should be folded or unfolded, and curved tracks 440 and 450, which are engaged with mesh gear 434, start to execute a rotational motion about joint 414, along directions 442 and 452, respectively. In one application, curved tracks 440 and 450 sandwich mesh gear 434 as illustrated in FIG. 5B. This figure also illustrates teeth 460 formed on the curved tracks and the mesh gear. Thus, actuating arms 420 and 422 pivot about joint 414, inducing sides 400 and 414 to either fold or deploy. FIG. 5C illustrates sides 400 and 406 further deployed comparative to FIG. 5A. Other arrangements may be imagined by those skilled in the art for rotating actuating arms 420 and 422 around joint 414, for example, providing an electric motor for each actuating arm.

In one application, each wing may be independently actuated, i.e., it may have its own actuating mechanism 340 discussed above. Power for the electric motors may be supplied through the streamer, from the vessel towing the streamers. Alternatively, batteries (not shown) may be provided inside each streamer steering device. Control unit 438 may be a local control unit that is in communication with a global control unit (not shown, but located on the vessel), and the two units may work together to control the operational and folded states of the streamer steering device.

FIG. 6 illustrates the wings being semi-deployed (i.e., an intermediary state between the operational state and the folded state) and FIG. 7 illustrates the wings being fully deployed. Note that FIG. 7 shows sides 400 and 406 aligned side by side to form half of wing 304, and sides 402 and 404 similarly aligned to form the other half of wing 304. In this operational state, wing 304 appears as a solid surface, i.e., does not have holes. However, water may pass through wing 304 at interface 700 between sides 400 and 406 and sides 402 and 404. In other words, depending on needs, interface 700 may be made watertight or not.

Control unit 438 may be instructed or configured to not fully deploy the wings, if necessary. In other words, actuating mechanism 340 may continuously change the wings from the folded state to the operational state, as desired by the operator of the seismic survey.

Figure 8:
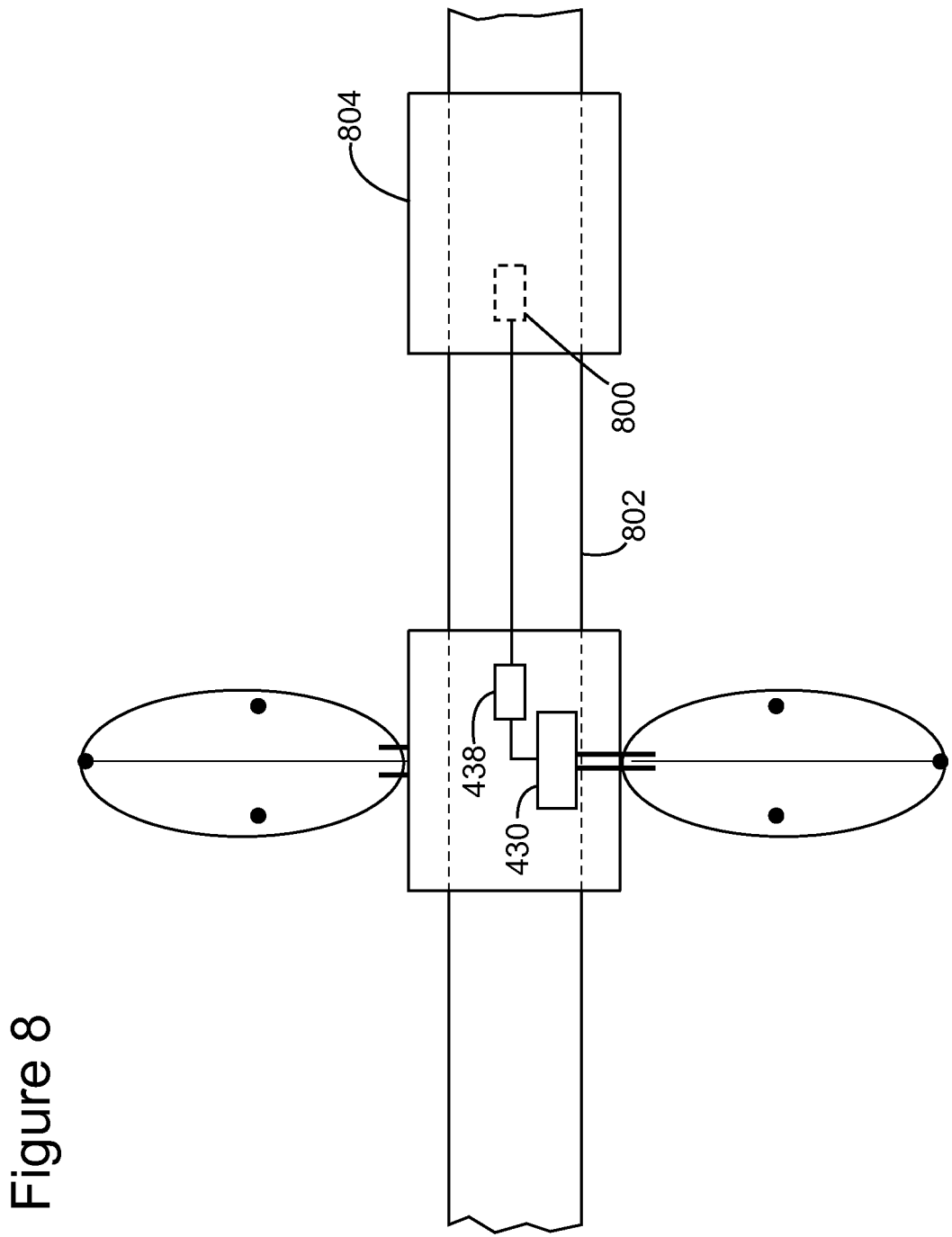
FIG. 8 is a schematic diagram of a streamer steering device having a sensor for detecting a cleaning device according to an embodiment.

In another embodiment, as illustrated in FIG. 8, a sensor 800 may be located inside the streamer 802 for detecting the presence of a streamer cleaning device 804. Sensor 800 may be in communication with control unit 438. When control unit 438 detects that streamer cleaning device 804 approaches the streamer steering device, it checks the state of the streamer steering device. If the state is folded, no further action is taken. However, if the state is operational, control unit 438 instructs actuating mechanism 430 to fold the wings so that the streamer cleaning device can pass it. In another embodiment, sensor 800 is in communication with a global control unit (not shown) located on the vessel, and the control action described above is coordinated by the global control unit. In still another application, control is shared by the global control unit and the local control unit 438.

For the above-discussed embodiments, the wings of the streamer steering devices are in the operational state while the seismic survey is performed so that the active surfaces can efficiently be used for steering if needed. When the streamer is retrieved after finishing the seismic survey, the wings may be in the folded state or in the operational state. While the streamer with the streamer steering device attached is towed through water, the wings may be switched from the operational state to the folded state when towing speed decreases (because by folding the wings, drag force decreases), or when the streamer becomes too close to another streamer (to avoid entangling of the streamer steering device with the other streamer and its instrumentation). The wings may be later unfolded (extended) when the towing speed recovers or when the distance between streamers increases.

Having the wings folded is also preferable when an equipment failure occurs. Folding the wings may also have the beneficial effect of releasing marine growth that has undesirably become attached to the active surfaces.

Figure 9:
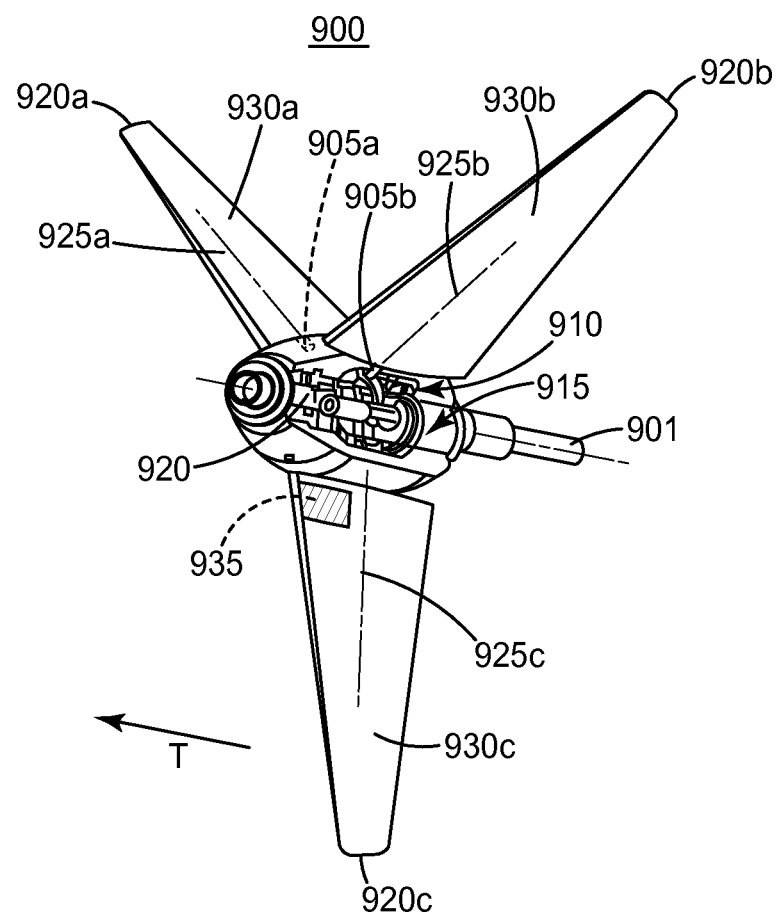
FIG. 9 is a schematic diagram of a streamer steering device having three foldable wings according to an embodiment.

In another embodiment illustrated in FIG. 9, a streamer steering device 900 has three wings, two of which are actively controlled for steering and one used as a keel. Wings 920a and 920b are controlled to achieve a desired steering force, while keel 920c is an element of stability and may also include a ballast body 935. Thus, wings 920a and 920b may be rotated around respective axes 925a and 925b, while keel 920c is free to rotate around axis 925c (being free to rotate, it is likely that the surface 930c will achieve a position in which equal pressures are exerted on its sides).

Due to ballast body 935, keel 920c tends to maintain a downward orientation and is less likely to get entangled with neighboring streamers or to have marine growth attached. In one embodiment, wings 920a and 920b and keel 920c are configured to switch between an operational state in which their respective active surfaces 930a and 930b are extended away from the body 910 (as shown), and a folded state in which the active surfaces 930a and 930b are folded close to the body 910. However, in another embodiment, only wings 920a and 920b are foldable.

A controller 915 and motors 905a and 905b are operable to control a rotation of wings 920a and 920b, respectively. These motors may be in addition to the motors necessary for changing a state of the wings, i.e., the actuating mechanism 430 illustrated in FIG. 4, between the operational state and the folded state. However, in another embodiment, the same motors are used for controlling the wings' rotation and changing their state. The motors may be located inside body 910. One or more sensors 920 may also be located on or inside the body 910. Sensor 920 may be used to determine when the cleaning device is approaching the streamer steering device and to instruct the controller 915 to automatically fold the wings so that the cleaning device can pass over the streamer steering device, when moving along the streamer.

Figure 10:
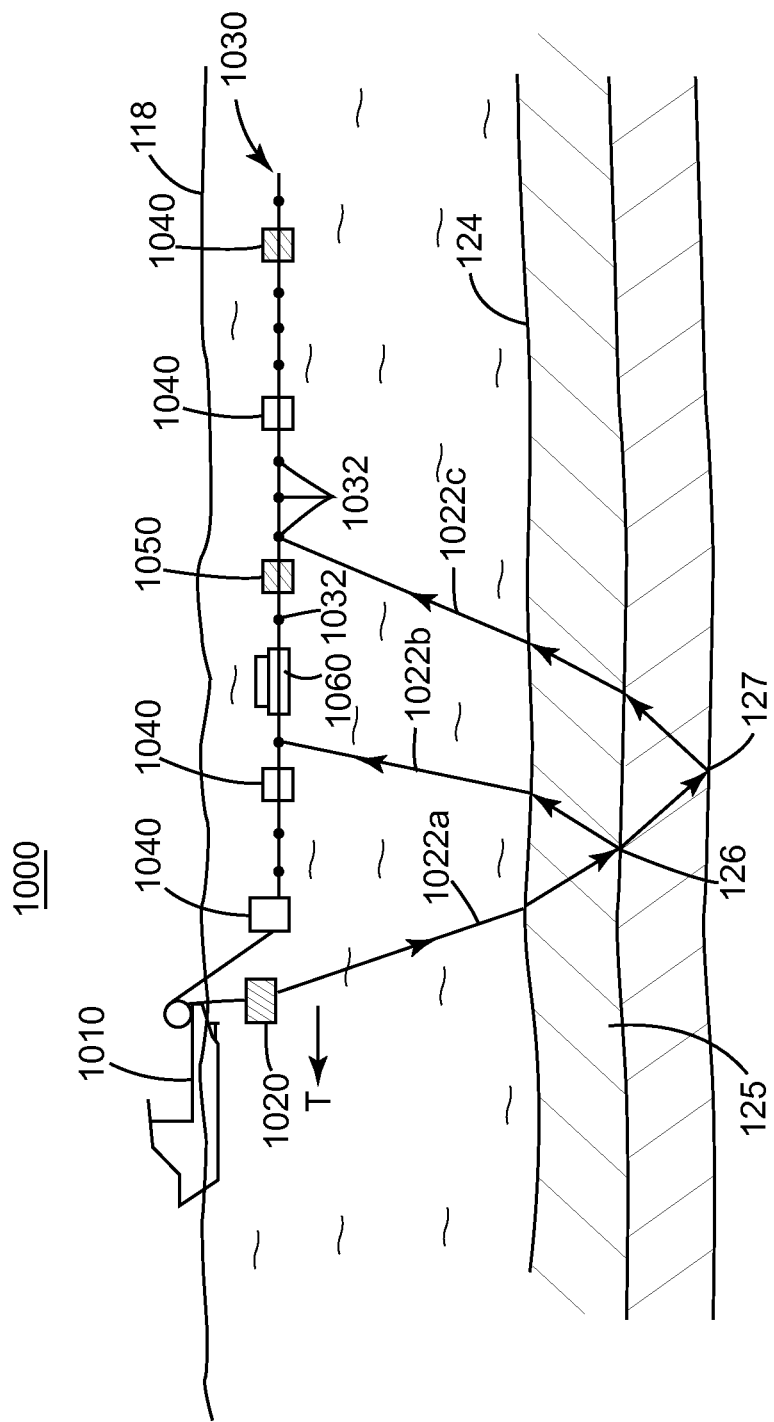
FIG. 10 is a schematic diagram of a marine seismic survey system using a streamer steering device according to an embodiment.

FIG. 10 is a schematic diagram of a marine seismic survey system 1000 using at least one streamer steering device according to an exemplary embodiment. A vessel 1010 tows a seismic source 1020 and plural streamers such as 1030, each streamer carrying an array of seismic receivers 1032 (e.g., hydrophones). The streamers are maintained at predetermined horizontal cross-line distances and at predetermined depths relative to the water surface 118. The streamers do not have to be horizontal; for example, the streamers may have a parameterized variable depth profile (e.g., a parabola). Streamer steering devices control the depth of the streamers along their length.

The seismic source 1020 is configured to generate seismic waves 1022a that propagate downward toward the seafloor 124 and penetrate the formation 125 under the seafloor 124 until they are eventually reflected at discontinuous locations 126 and 127. The seismic source may include plural individual sources that may be located on a horizontal line, slanted line, etc.

The reflected seismic waves such as 1022b and 1022c propagate upward and can be detected by one of receivers 1032 on streamer 1030. Based on the data collected by receivers 1032, an image of the subsurface formation 125 is generated.

To maintain the streamers or sources at a desired position (i.e., such as to have predetermined cross-line distances and predetermined depths), one or more streamer steering devices 1040 may be attached to streamer 1030 or to source 1020. At least one streamer steering device 1050 has one or more foldable wings as described above. Although in FIG. 10, streamer steering device 1050 is singled out as having one or more foldable wings, it should be understood that some or all streamer steering devices 1040 may have foldable wings similar to device 1050. A cleaning device 1060 traveling along streamer 1030 may pass over streamer steering device 1050 having at least one wing in a folded state.

Figure 11:
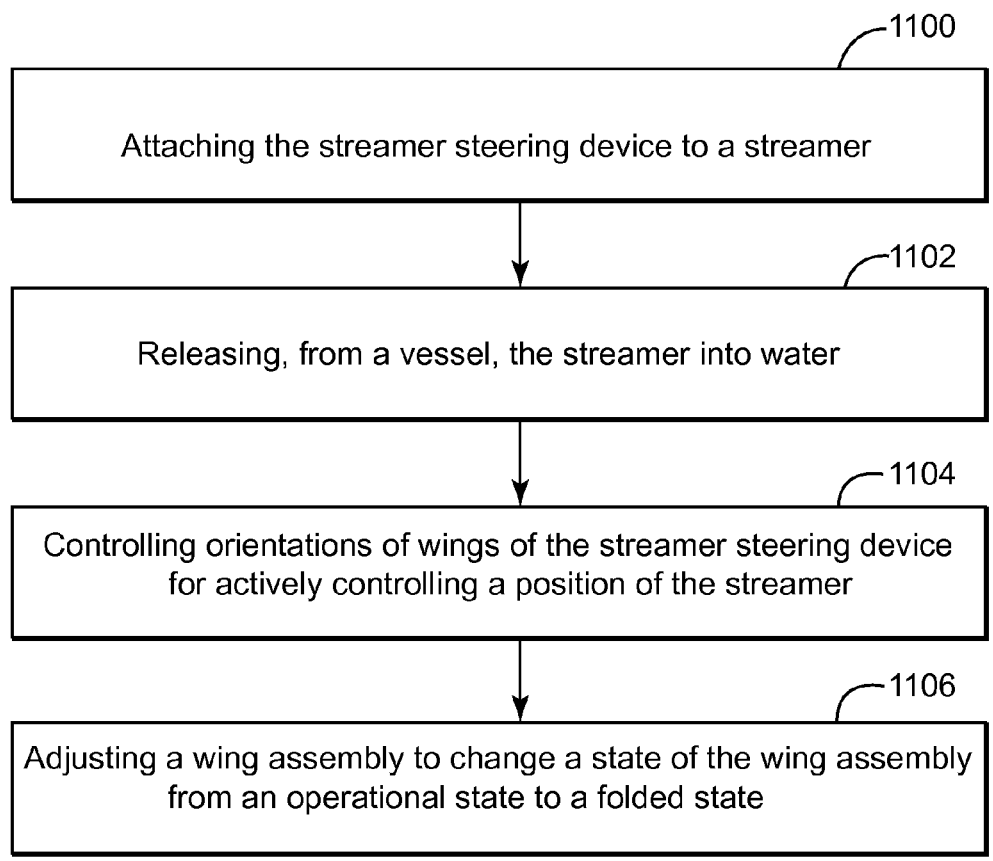
FIG. 11 is a flowchart illustrating a method for using a streamer steering device with foldable wings according to an embodiment.

A method for controlling a streamer steering device as noted above is now discussed with regard to FIG. 11. The method includes a step 1100 of attaching the streamer steering device to a streamer, a step 1102 of releasing, from a vessel, the streamer into water, a step 1104 of controlling orientations of wings of the streamer steering device for actively controlling a position of the streamer, and a step 1106 of adjusting a wing assembly to change its state from operational to folded. The active surface of the wing assembly has substantially the same area during both the operational and folded states.

Figure 12:
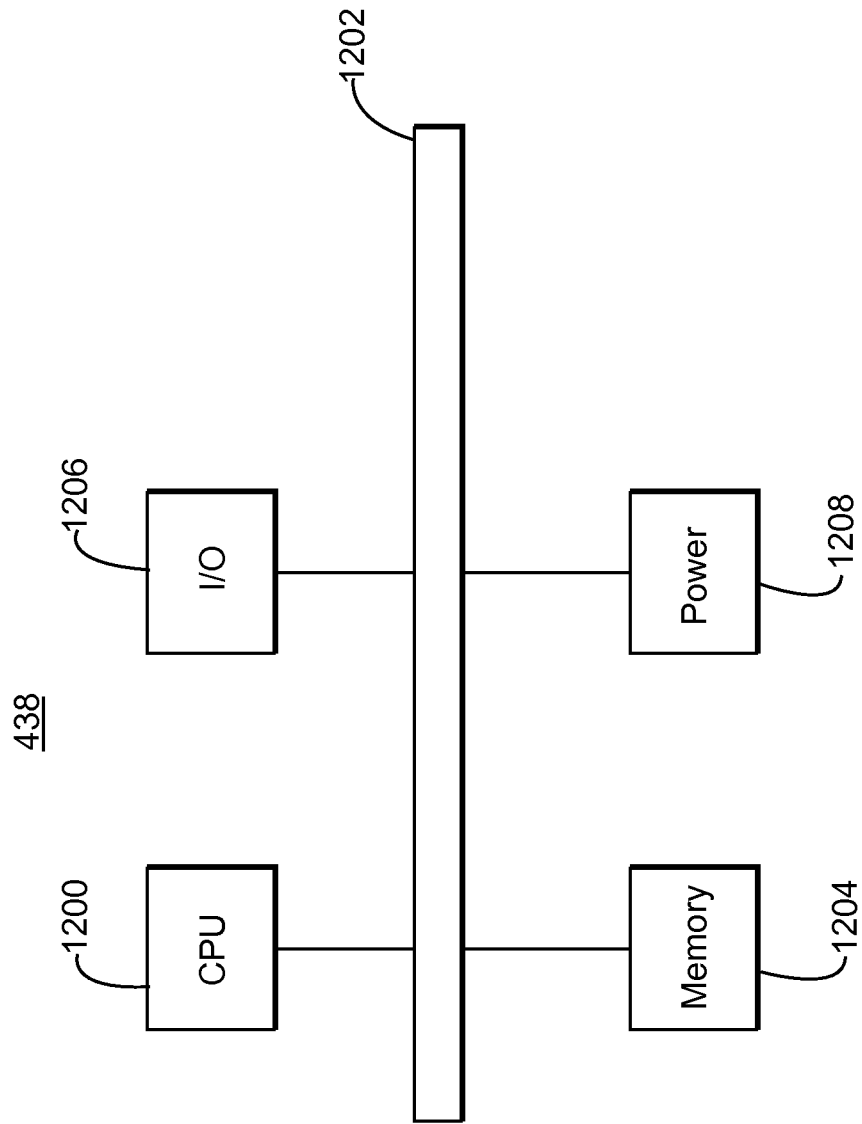
FIG. 12 is a schematic diagram of a control unit that controls a streamer steering device having foldable wings according to an embodiment.

FIG. 12 illustrates a configuration of the local control unit 438, and this structure is also applicable to the general control unit. Control unit 438 includes a processor 1200 connected to a bus 1202. The processor may run various instructions, which may be stored by a storing device 1204, also connected to the bus 1202. Processor 1200 may also be connected to an input/output interface 1206 that provides support for communication with the global control unit, or directly with the operator. The I/O interface may include a radio link, a wireless type link, etc. Control unit 438 may also include a power unit 1208 for supplying electric power. Other known units may be part of the control unit.

The disclosed exemplary embodiments provide streamer steering devices that have foldable wings. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that would be obvious to those skilled in the art. Such other examples are intended to be within the scope of the claims.

What is claimed is:

1. A streamer steering device for a streamer or a source of a marine seismic survey system, the streamer steering device comprising:
   a casing configured to be attached to the streamer or to the source;
   a wing assembly connected to the casing and having an active surface used to control depth and/or lateral position of the streamer; and
   an actuating mechanism located inside the casing and connected to the wing assembly, the actuating mechanism being configured to change a state of the wing assembly from an operational state to a folded state,
   wherein the active surface has substantially the same area during the operational state and the folded state, and
   wherein the wing assembly includes first and second wings, each wing including sides connected to each other to form a square or a diamond when in an intermediary state between the operational state and the folded state and wherein the sides are connected to each other by joints and each side is configured to move relative to another side.

2. The device of claim 1, wherein the active surface has substantially the same area during the operational state, the folded state and an intermediary state, between the operational state and the folded state.

3. A steering device for a streamer or a source of a marine seismic survey system, the steering device comprising:
   a casing configured to be attached to the streamer or to the source;
   a wing assembly connected to the casing and having an active surface used to control depth and/or lateral position of the streamer; and
   an actuating mechanism located inside the casing and connected to the wing assembly, the actuating mechanism being configured to change a state of the wing assembly from an operational state to a folded state,
   wherein the wing assembly includes first and second wings, each wing including sides connected to each other, and
   wherein the sides form an empty space when in the intermediary state.

4. The device of claim 1, wherein each wing includes four sides, and two of the sides, closest to the casing, are connected to corresponding actuating arms.

5. The device of claim 4, further comprising:
   curved tracks, each connected to a corresponding actuating arm and having teeth.

6. The device of claim 5, further comprising:
   a motor; and
   a mesh gear configured to engage with the curved tracks so that when the motor rotates, the mesh gear rotates, making the curved tracks to translate along opposite curved directions, thus folding or unfolding the wing assembly.

7. The device of claim 6, further comprising:
   a sensor for detecting when a cleaning device that runs along the streamer approaches the casing.

8. The device of claim 7, further comprising:
   a controller located inside the casing and configured to receive information from the sensor, the controller instructing the wing assembly to fold when the cleaning device approaches the casing.

9. The device of claim 1, further comprising:
   a keel that is not actively steered and which has an active surface substantially the same area during the operational state, the folded state and an intermediary state, between the operational state and the folded state.

10. A marine seismic survey system for collecting seismic data, the marine seismic survey system comprising:
    a streamer; and
    a streamer steering device connected to the streamer,
    wherein the streamer steering device includes,
    a casing configured to be attached to the streamer,
    a wing assembly connected to the casing and having an active surface used to control depth and/or lateral position of the streamer, and
    an actuating mechanism located inside the casing and connected to the wing assembly, the actuating mechanism being configured to change a state of the wing assembly from an operational state to a folded state,
    wherein the active surface has substantially the same area during the operational state and the folded state, and
    wherein the wing assembly includes first and second wings, each wing including sides connected to each other to form a square or a diamond when in an intermediary state between the operational state and the folded state, and wherein the sides are connected to each other by joints and each side is configured to move relative to another side.

11. The system of claim 10, wherein the active surface has substantially the same area during the operational state, the folded state and an intermediary state, between the operational state and the folded state.

12. The system of claim 10, wherein
the sides form an empty space when in the intermediary state, and
each wing includes four sides, and two of the sides, closest to the casing, are connected to corresponding actuating arms.

13. The system of claim 12, further comprising:
curved tracks, each connected to a corresponding actuating arm and having teeth;
a motor; and
a mesh gear configured to engage with the curved tracks so that when the motor rotates, the mesh gear rotates, making the curved tracks to translate along opposite curved directions, which consequently fold or unfold the wing assembly.

14. A marine seismic survey system for collecting seismic data, the marine seismic survey system comprising:
a streamer;
a streamer steering device connected to the streamer,
wherein the streamer steering device includes,
a casing configured to be attached to the streamer,
a wing assembly connected to the casing and having an active surface used to control depth and/or lateral position of the streamer, and
an actuating mechanism located inside the casing and connected to the wing assembly, the actuating mechanism being configured to change a state of the wing assembly from an operational state to a folded state,
wherein the active surface has substantially the same area during the operational state and the folded state;
a cleaning device running along the streamer for cleaning the streamer;
a sensor for detecting when the cleaning device approaches the casing; and
a controller located inside the casing and configured to receive information from the sensor, the controller instructing the wing assembly to fold when the cleaning device approaches the casing.

15. A method for folding a streamer steering device, the method comprising:
attaching the streamer steering device to a streamer;
releasing, from a vessel, the streamer into water;
controlling orientations of wings of the streamer steering device for actively controlling a position of the streamer; and
adjusting the wings to change their state from an operational state to a folded state,
wherein an active surface of the wings has substantially the same area during the operational state and the folded state, and
wherein each wing includes sides connected to each other to form a square or a diamond when in an intermediary state between the operational state and the folded state and wherein the sides are connected to each other by joints and each side is configured to move relative to another side.

16. The method of claim 15, wherein the active surface has substantially the same area during the operational state, the folded state and an intermediary state, between the operational state and the folded state.

17. The method of claim 15, wherein the wings include first and second wings, each wing including sides connected to each other to form a square or a diamond when in an intermediary state between the operational state and the folded state.

* * * * *